(12) United States Patent
Wada et al.

(10) Patent No.: US 7,696,838 B2
(45) Date of Patent: Apr. 13, 2010

(54) EQUALIZING FILTER CIRCUIT

(75) Inventors: Shigeki Wada, Tokyo (JP); Yasuyuki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 11/662,414

(22) PCT Filed: Sep. 9, 2005

(86) PCT No.: PCT/JP2005/017077

§ 371 (c)(1),
(2), (4) Date: Mar. 9, 2007

(87) PCT Pub. No.: WO2006/028288

PCT Pub. Date: Mar. 16, 2006

(65) Prior Publication Data

US 2008/0198912 A1    Aug. 21, 2008

(30) Foreign Application Priority Data

Sep. 9, 2004    (JP)    ............................. 2004-261835

(51) Int. Cl.
*H04B 3/14* (2006.01)
*H04B 3/04* (2006.01)
*H03H 7/38* (2006.01)

(52) U.S. Cl. ...................... 333/28 R; 333/18; 333/165; 333/166; 375/229; 375/230; 375/232; 375/233

(58) Field of Classification Search .................. 333/18, 333/28 R, 165, 166; 375/229, 230, 232, 375/233
See application file for complete search history.

(56) References Cited

U.S. PATENT DOCUMENTS 4,786,989 A * 11/1988 Okamura et al. .............. 360/65
4,921,286 A * 5/1990 Nakamura ................... 292/216
5,055,795 A * 10/1991 Kasper et al. ................. 330/54
5,070,304 A * 12/1991 Salib et al. .................... 330/54
5,168,250 A * 12/1992 Bingham .................... 333/139
5,546,460 A * 8/1996 Biedermann et al. ... 379/406.08
7,504,976 B1 * 3/2009 Pellon ........................ 341/143

FOREIGN PATENT DOCUMENTS

| JP | 4-145712 | 5/1992 |
|----|----------|--------|
| JP | 11-355099 | 12/1999 |
| JP | 2003-258606 | 9/2003 |

OTHER PUBLICATIONS

Borjak, Assaad et al "High-Speed Generalized Distributed-Amplifier-Based Transversal-Filter Topology for Optical Communication Systems" IEEE Transactions on Microwave Theory and Techniques, vol. 45, No. 8, Aug. 1997; pp. 1453-1457.

* cited by examiner

*Primary Examiner*—Robert Pascal
*Assistant Examiner*—Kimberly E Glenn
(74) *Attorney, Agent, or Firm*—Young & Thompson

(57) ABSTRACT

In an equalizing filter circuit having an input terminal 101, an output terminal 102, delay devices 104 connected in multi-stage to the input terminal 101, and a plurality of weighting circuits 105 which are branched from and connected to the plurality of delay devices to thereby combine respective output signals of the weighting circuits, gain adjustment of the weighting circuits is performed to determine a coefficient of the equalizing filter circuit without depending on a load connected to the output terminal. Thus, an amount of compensation for a distorted waveform may be enhanced. To this end, an impedance converting circuit 108 is connected between at least one weighting circuit and the output terminal.

24 Claims, 14 Drawing Sheets

EQUALIZING FILTER CIRCUIT

TECHNICAL FIELD

The present invention relates to an equalizing filter circuit, which compensates for distortion of a signal waveform generating in a transmission medium, in an optical communication using an optical fiber, a telecommunication by wires, and also a radio communication.

BACKGROUND ART

In various transmission systems, a weighted and delayed equalizing filter circuit is often employed as one technological measures to electrically compensate for waveform distortions generating due to dispersion or loss in a transmission medium.

In FIG. 19, there is shown a circuit block diagram of a conventional weighted and delayed equalizing filter circuit. Incidentally, the circuit in question is often called as a Transversal Filter, a FIR (Finite impulse Response) digital filter, or a Feed Forward Equalizer. These types of circuits have been described in, for example, non-patent publication 1 (i.e., A. Borjak, et al., "High-Speed Generalized Distributed Amplifier-Based Transversal-Filter Topology for Optical Communication System," IEEE Trans. Microwave Theory Tech., Vol. 45, No. 8, pp. 1453-1457)

In FIG. 19, reference numeral 1201 designates a filter input terminal; 1202, a filter output terminal; 1203, a load generating in an output circuit connected to output terminal 1202 (it will be hereinafter referred to as an output load); 1204, delay devices or units(T) connected in cascade to the input terminal; 1205, weighting circuits; 1210, an adder which adds therein the outputs from the respective weighting circuits 1205; 1231, an output impedance of the input circuit, which is connected to the input terminal 1201; and 1232, an electric terminating resistance connected to the end of the delay devices connected in cascade.

A signal inputted into the present filter is delayed by a desired delay by respective of the delay devices 1204 to be outputted as respective output signals. Then, desired weight values (filter coefficient) are given by the respective weighting circuits 1205. The signals from these weighting circuits 1205 are added together by the adder 1210 to be eventually outputted via the output terminal 1202.

By applying this kind of signal processing, waveform deformation is compensated for in an electric signal while waveform equalizing is realized in optical communication by carrying out photo-electric conversion of an optical dispersion waveform by a photodiode or the like and by thereafter performing correction.

FIG. 20 exemplifies such a transversal filter circuit. The conventional transversal filter circuit of this type is described in, for example, non-patent publication 2 ("Differential 4-tap and 7-tap Transverse Filters in SiGe for 10 Gb/s Multimode Fiber Optic Equalization", International Solid-State Circuit Conference (ISSCC) 2003, Session, 10, Paper 10.4, pp. 180-181).

In FIG. 20, reference numeral 1301 designates a filter terminal; 1302, a filter output; 1303, an output load formed in an output circuit, which is connected to the filter output 1302; 1304, delay units connected in cascade to the input side; 1305, weighting circuits; 1306, delay units (T) connected in cascade to the output side; 1307, a load to terminate the cascaded delay units 1307; 1331, an output impedance of the input circuit connected to the input terminal 1301; and 1332, a terminating resistance. In this transversal filter, the output load 1303 forms an adder. By this circuit configuration, an input signal is given delays and weighting values so that desired waveform equalization can be achieved.

DISCLOSURE OF THE INVENTION

In the equalizing filter circuit shown in FIG. 20, when a load of 50 ohms is connected to the output terminal 1302 as the output load 1303, it is necessary to design that an impedance of the output side that is seen from the output terminal 1302 becomes equal to 50 ohms, in order to prevent reflection between the output load of 50 ohms and the circuit. This requires that the terminating resistance (the load 1307) for impedance matching, connected to the other side opposite to the output terminal of the transmission line used as the delay units 1306, should be equal to 50 ohms.

In this circuit configuration, the effective output load resistance of each of the weighting circuits 1305 becomes equal to 25 ohms. Thus, a large output amplitude can not be obtained. Therefore, there is such a problem that a variable width of a gain is limited in each weighting circuit of the equalizing filter circuit. As a result, a distorted waveform that can be compensated for is extensively restricted.

On the other hand, under a condition such that the output load resistance is kept at 25 ohms, when the size of the weighting circuits 1305 is increased, respectively, and the gain is increased, the bandwidth characteristic of the equalizing filter circuit must be undesirably deteriorated. As a result, there is a problem such that the operation speed of the filter is lowered. As will be understood from the foregoing, in the conventional circuit, a gain adjustment width of the weighting circuits 1305 cannot be arbitrarily set without deterioration of the bandwidth characteristic and accordingly, it was very extremely difficult to enhance an amount of compensation for the waveform distortion.

The object of the present invention is to provide a broadband equalizing filter circuit which is able to set a gain adjustment of weighting circuits without depending on a load of an output circuit connected to an output terminal, and is able to easily increase an amount of compensation for the waveform distortion.

According to the present invention, there is provided an equalizing filter circuit comprising an input terminal, an output terminal, delay devices connected in multi-stage to the input terminal, and a plurality of weighting circuits branching from and connected to a plurality of weighting circuits, to thereby combine respective output signals of the weighting circuits together, wherein a load in at least one of the weighting circuits has an impedance value which is different from that of a load (output load) formed in an output circuit connected to the output terminal.

According to the present invention, there is provided an equalizing filter circuit comprising an input terminal, an output terminal, delay devices connected in multi-stage to the input terminal, and a plurality of weighting circuits branching from and connected to a plurality of weighting circuits, to thereby combine respective output signals of the weighting circuits together, wherein an impedance converting circuit is connected at a position between at least one of the weighting circuits and the output terminal.

Further preferably, the weighting circuits comprise gain adjustable amplifier devices which are connected in a multi-step manner.

In the equalizing filter circuit, when a load of 50 ohms is connected to the output terminal as the output load, it is necessary to design that an impedance of the output side that is seen from the output terminal becomes equal to 50 ohms, in order to prevent reflection between the output load of 50 ohms and the circuit. This requires that the terminating resistance (the load 1307) for impedance matching, connected to the other side opposite to the output terminal of the transmission line used as the delay units, should be equal to 50 ohms.

Therefore, the effective output load resistance of each of the weighting circuits becomes equal to 25 ohms. Thus, a large output amplitude can not be obtained. Therefore, there is such a problem that a variable width of a gain is limited in each weighting circuit of the equalizing filter circuit. As a result, a distorted waveform that can be compensated for is extensively restricted.

On the other hand, under a condition such that the output load resistance is kept at 25 ohms, when the size of the weighting circuits 1305 is increased, respectively, and the gain is increased, the bandwidth characteristic of the equalizing filter circuit must be undesirably deteriorated. As a result, there is a problem such that the operation speed of the filter is lowered. As will be understood from the foregoing, in the conventional circuit, a gain adjustment width of the weighting circuits 1305 cannot be arbitrarily set without deterioration of the bandwidth characteristic and accordingly, it was very extremely difficult to enhance an amount of compensation for the waveform distortion.

The object of the present invention is to provide a broadband equalizing filter circuit which is able to set a gain adjustment of weighting circuits without depending on a load of an output circuit connected to an output terminal, and is able to easily increase an amount of compensation for the waveform distortion.

According to the present invention, there is provided an equalizing filter circuit comprising an input terminal, an output terminal, delay devices connected in multi-stage to the input terminal, and a plurality of weighting circuits branching from and connected to a plurality of weighting circuits, to thereby combine respective output signals of the weighting circuits together, wherein a load in at least one of the weighting circuits has an impedance value which is different from that of a load (output load) formed in an output circuit connected to the output terminal.

According to the present invention, there is provided an equalizing filter circuit comprising an input terminal, an output terminal, delay devices connected in multi-stage to the input terminal, and a plurality of weighting circuits branching from and connected to a plurality of weighting circuits, to thereby combine respective output signals of the weighting circuits together, wherein an impedance converting circuit is connected at a position between at least one of the weighting circuits and the output terminal.

Further preferably, the weighting circuits comprise gain adjustable amplifier devices which are connected in a multi-step manner.

BEST MODE FOR CARRYING OUT THE INVENTION

A detailed description of the present invention will be provided hereinbelow, with reference to the accompanying drawings.

Figure 1:
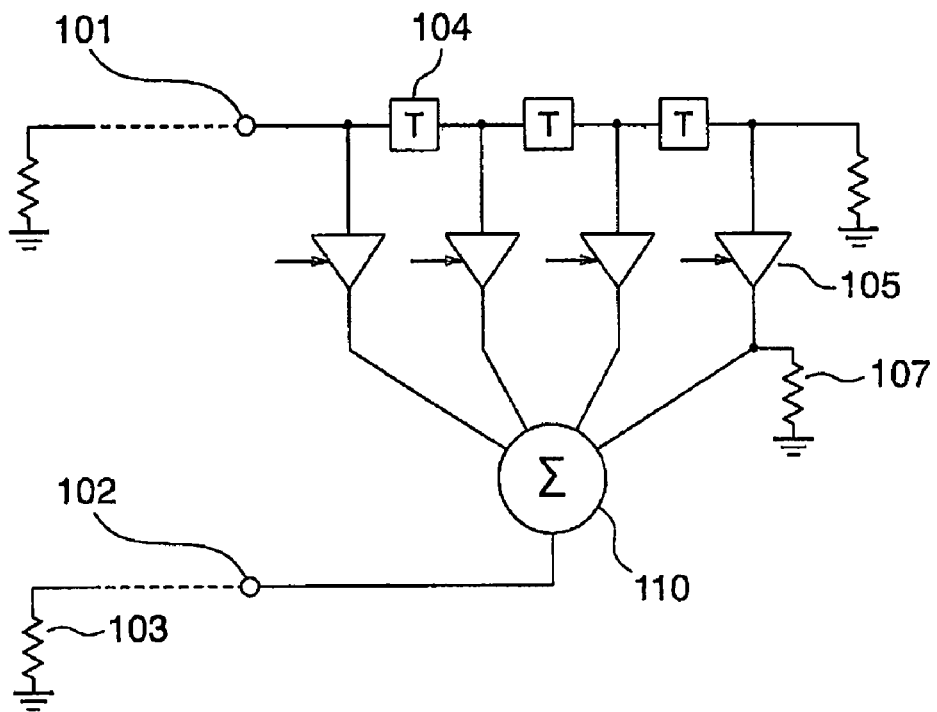
FIG. 1 is a block diagram illustrating a first embodiment of the present invention.

FIG. 1 is a block diagram illustrating the first embodiment of the present invention. In FIG. 1, 101 denotes an input terminal; 102, a filter output terminal; 103, an output load of an output circuit connected to the filter output terminal 102; 104, delay units or devices connected in cascade to the filter input terminal 101; 105, gain adjustable weighting circuits; 107, a load having an impedance value different from that of the output load 103 and connected to the weighting circuit 105; and 110, an adder that superposes outputs from the respective weighting circuits 105. Herein, it is to be noted that the adder 110 may be formed by either a passive element such as an electric resistance and the like or an active element such as a transistor.

The present embodiment is specified by the load 107 that has the impedance value different from that of the output load 103 connected to the output terminal and that is provided as a load impedance of the weighting circuit 105. This structure makes it possible to optionally set an adjustable range of the gain in the weighting circuit 105 without any influence of the output load 103 of the output terminal. In FIG. 1, although the load 107 is connected to only a single weighting circuit 105, it may be connected to a plurality of the weighting circuits 105. According to this configuration, a freedom of design of adjustable gain of the weighting circuit or circuits 105 can be increased. In addition, it is possible to realize a large compensation for a distorted waveform in comparison with the conventional equalizing filter circuit, with a required bandwidth characteristic maintained.

Figure 2:
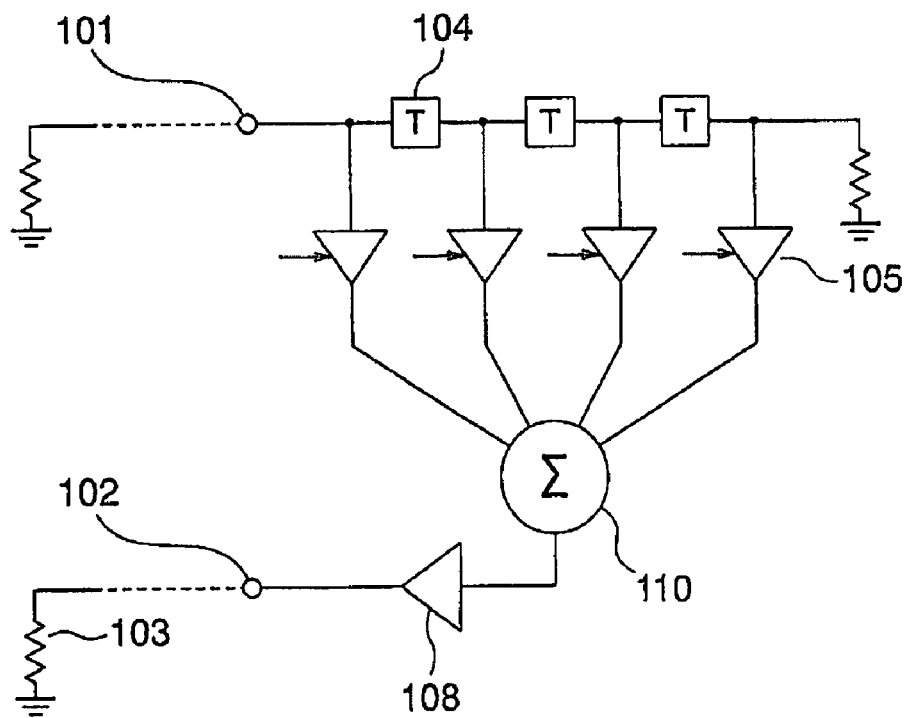
FIG. 2 is a block diagram illustrating a second embodiment of the present invention.

FIG. 2 is a block diagram illustrating the second embodiment of the present invention. In FIG. 2, parts similar or identical to those of the first embodiment shown in FIG. 1 are denoted by the same reference numerals, and any duplicated description will be omitted. In the second embodiment as shown in FIG. 2, an impedance converting circuit 108 is connected between the adder 110 and the output terminal 102. According to the present embodiment, an impedance of a load connected to the weighting circuit 105 can be set optionally without being affected by the output load 103. Therefore, a degree of freedom in designing of adjustable gain of the weighting circuit 105 can be increased and thus, a large compensation for a distorted waveform can be achieved in comparison with the conventional equalizing filter circuit, while maintaining a required bandwidth characteristic. A description of preferred embodiments of the present invention will be provided hereinbelow.

Figure 3:
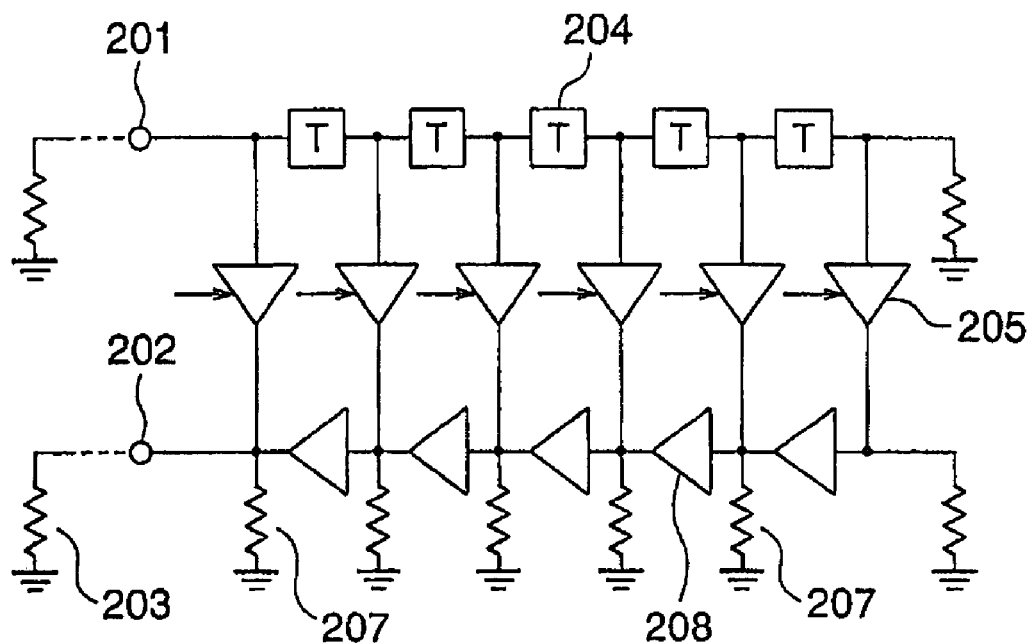
FIG. 3 is a circuit diagram illustrating a configuration of the first embodiment of the present invention.

FIG. 3 is a circuit diagram illustrating an equalizing filter circuit according to a first embodiment of the present invention in a transversal filter. In FIG. 3, reference numeral 201 designates a filter input terminal; 202, a filter output terminal; 203, an output load formed by an output circuit of the present filter; 204, delay units or devices connected in cascade to the input side; 205, gain adjustable weighting circuits connected, at their respective input terminals, to an output terminal of each of the delay devices 204 and the input terminal 201; 207, loads having respective impedances of which values are different from that of the output load 203 and connected to the output ends of the respective weighting circuits 205; and 208, impedance converting circuits connected between the respective neighboring output ends of the weighting circuits 205. Now, it is to be noted that the respective loads 207 are not needed to have an identical value. In the present embodiment, an adder is comprised of the load 207 located at the final stage (i.e., the leftmost load in the drawing figure).

Figure 4:
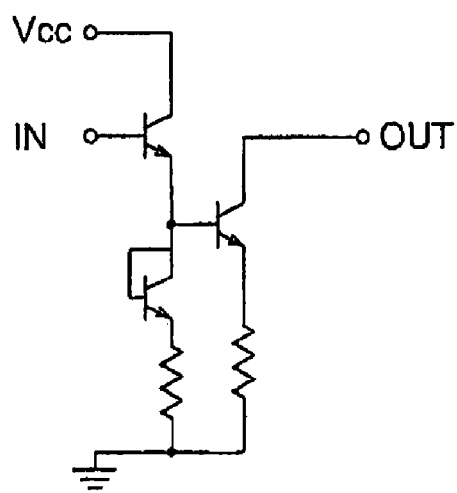
FIG. 4 is a circuit diagram illustrating a configuration of an impedance converting circuit used in the first embodiment of the present invention.

FIG. 4 is a circuit diagram illustrating a concrete configuration of the impedance converting circuit 208. As is shown in FIG. 4, a signal inputted from an input terminal IN is transmitted to a transistor having an open collector via an emitter follower, and is outputted from an output terminal OUT. This impedance converting circuit 208 has a delay time between the input and output terminals and therefore, it implements a function of a delay device.

In the present embodiment, to the respective weighting circuits 205, are connected the loads 207 which have the impedance value different from that of the output load 203 connected to the output terminal, and the range of a gain adjustment of the weighting circuit can be optionally set without any influence from the output load. Further, if the output loads 207 of the respective weighting circuits are increased in response to attenuation of a signal that generates during transmitting of the signal from the input terminal through the multi-stage delay units, a uniform output characteristic can be acquired among the respective weighting circuits. Hence, it is possible to greatly improve the range of gain adjustment of the weighting circuit and accordingly, an augmentation of compensation amount of the distorted waveform as well as an achievement of a necessary bandwidth characteristic can be realized in comparison with the conventional weighting circuit.

Figure 5A:
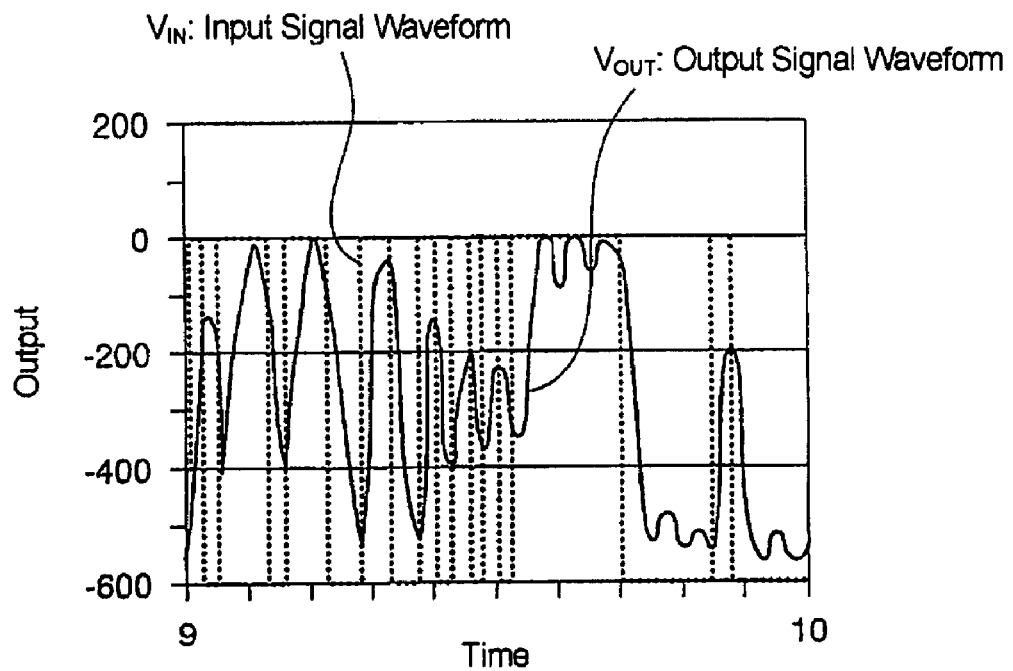
FIGS. 5A and 5B are diagrammatic views illustrating an example of a waveform distortion of a transmission signal transmitting through a transmission medium.
Figure 5B:
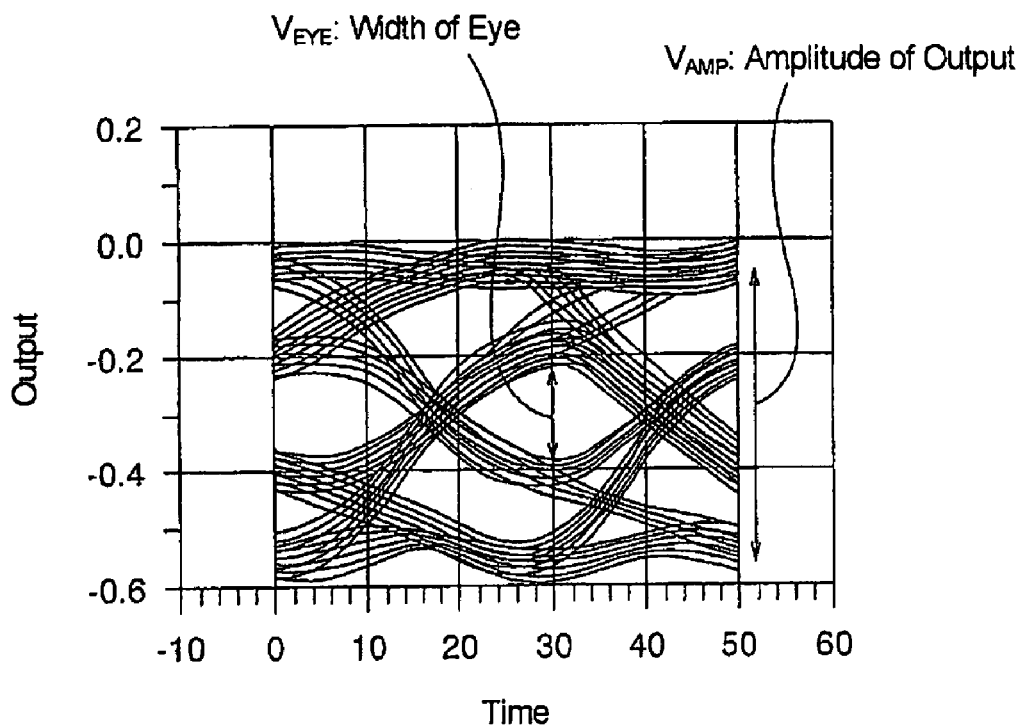

Now, advantages of the embodiment of the present invention will be described with reference to the accompanying drawings. FIGS. 5A and 5B are waveform diagrams illustrating as to how distortion of a signal occurs due to either loss or dispersion by the transmitting medium during transmitting of the signal through the transmitting medium. As shown in FIG. 5A, a waveform $V_{in}$ of an input signal prior to being transmitted through the transmitting medium is distorted to the waveform $V_{out}$ after transmission due to the loss caused by the band restriction of the transmitting medium and the dispersion caused by the material property of the transmitting medium. Specifically, in a portion in which an inversion of the sign of signal continually occurs, the amplitude of the signal is greatly decreased. Thus, in the eye pattern of the signal waveform evaluated by superposing the signal waveform after transmission onto that prior to transmission, as shown in FIG. 5B, an opening width VEYE of the eye which is important for the data discrimination becomes narrow and therefore, an eye opening ratio ($V_{EYE}/V_{AMP}$) that is determined as a ratio of the eye opening width $V_{EYE}$ to the output amplitude $V_{AMP}$ must be deteriorated.

Figure 6A:
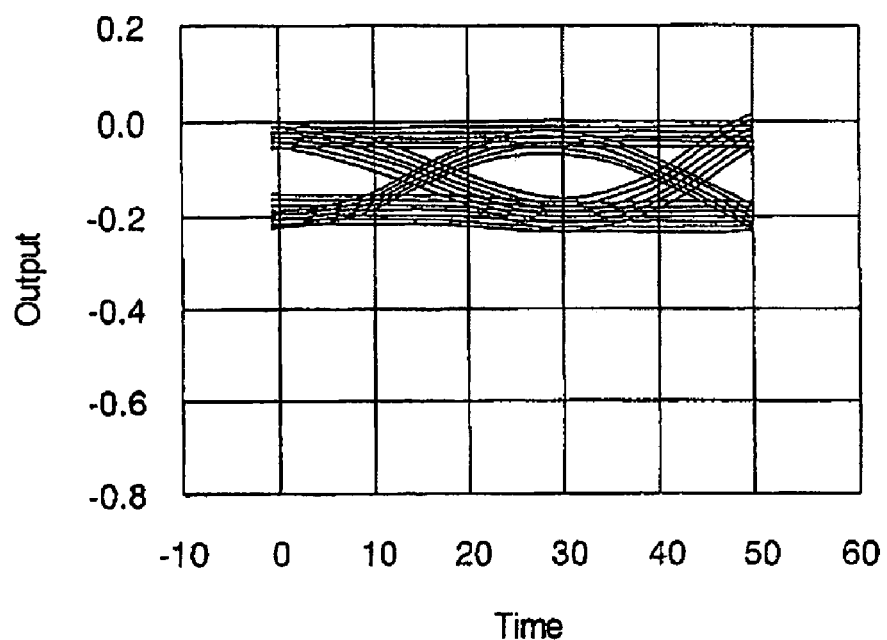
FIGS. 6A and 6B are diagrammatic views illustrating waveforms after compensation of the circuit of the present invention and that according to the prior art.
Figure 6B:
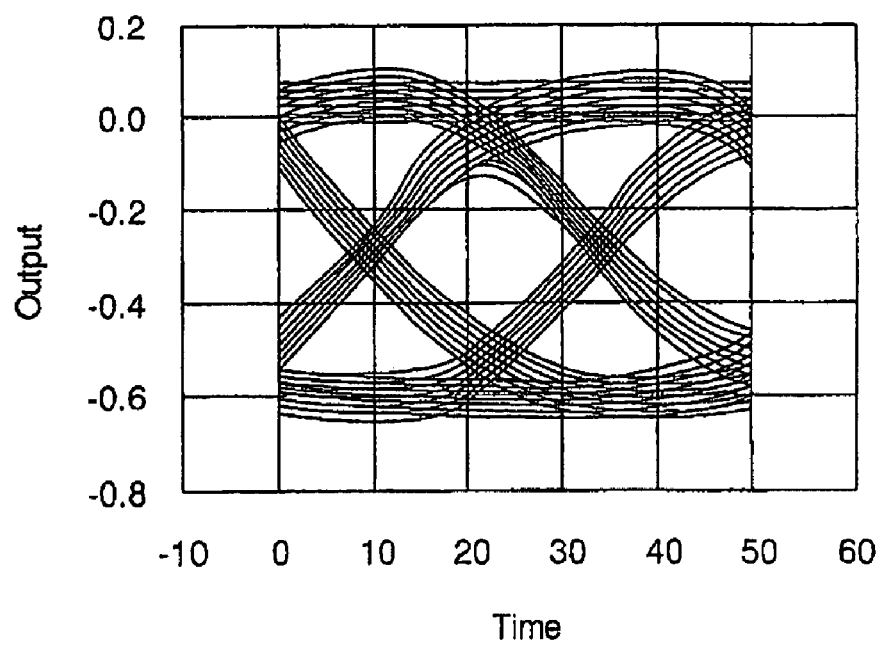

FIGS. 6A and 6B are waveform diagrams illustrating the signal eye waveforms after compensation according to the conventional circuit and the embodiment of the present invention. In case of the conventional equalizing filter circuit, the load of the weighting circuit cannot be optionally set so that a sufficient gain cannot be acquired. Hence, with the conventional circuit, as shown in FIG. 6A, both an output amplitude and an opening width of the eye waveform after compensation are narrow and as a result, signal error is apt to occur by the influence of noise and the like.

On the other hand, according to the embodiment of the present invention, the load of the weighting circuit can be individually set to be high so that the gain of the circuit may be made large. As a result, as shown in FIG. 6B, a large eye opening width can be realized as compared with the conventional circuit and, as a result, the signal error can be remarkably reduced. Hence, when comparison of the conventional circuit with the circuit of the present invention is made under an identical signal error rate, better compensation of distorted waveform can be achieved by the circuit configuration of the present invention. Namely, it is indicated that an extent of compensation is wide. When the minimum amplitude value of "signal waveform VOUT after transmission" which is able to be subjected to an error free compensation for is employed as an indicator for representing the compensation extent, such a result was shown that the above-mentioned value can be enhanced 15% or more.

Incidentally, in the present embodiment, the impedance converting circuit can also operates as the delay device and accordingly, such an advantageous effect can be accomplished by an IC chip of a small area.

Figure 7:
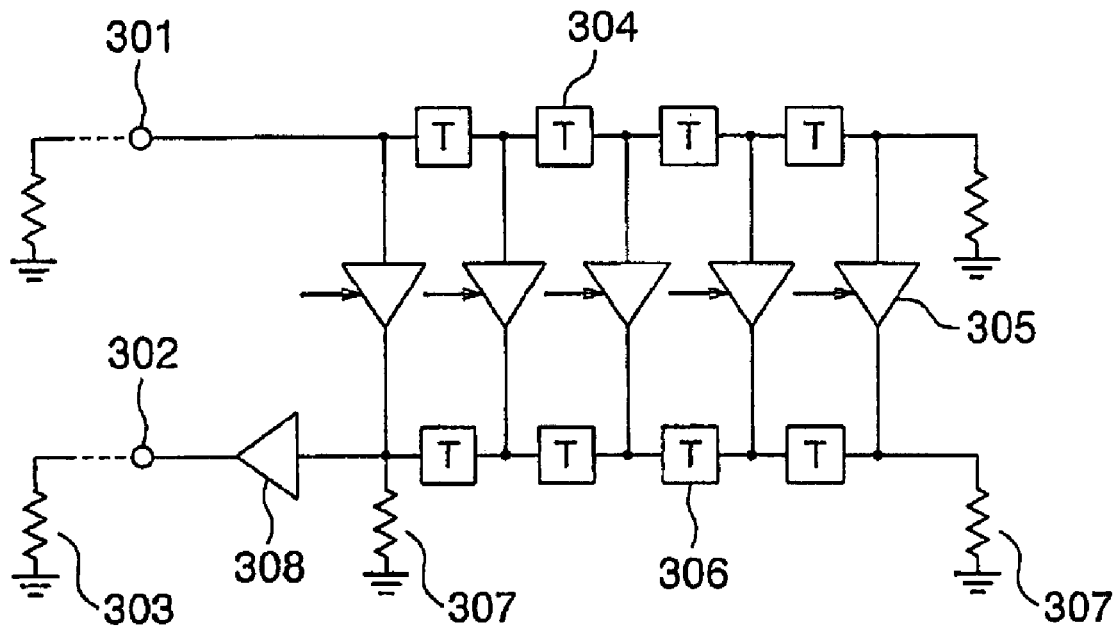
FIG. 7 is a circuit diagram illustrating a configuration of a second embodiment of the present invention.

FIG. 7 is a circuit diagram illustrating an equalizing filter circuit according to the second embodiment of the present invention in a transversal filter. Reference numeral 301 denotes a filter input terminal; 302, a filter output terminal; 303, an output load that is formed in the output circuit of the present filter; 304, delay devices connected in cascade to the input side; 305, gain adjustable weighting circuits having input ends thereof connected to the input terminal 301 and output ends of the respective delay devices 304; 306, delay devices connected in cascade to the output side; 307, loads connected to the opposite ends of the delay devices that are connected in cascade to the output side and having an impedance, respectively, which is different from that of the output load 303; and 308, an impedance converting circuit connected to the output end of the delay devices on the output side. In the present embodiment, the output load 303 is 50 ohms, and the two loads 307 are set at 100 ohms, respectively.

In the present embodiment, the loads 307 having impedance values, respectively, different from that of the output load 303 are connected to the weighting circuits 305, and the range of gain adjustment of the weighting circuits can be optionally set without influence by the impedance value of the output load 303. Further, when matching is taken among the delay devices 306 connected in cascade to the output terminal 302, the loads 307 and the output portions of the weighting circuits, it is possible to realize an equalizing filter characteristic of broadband and high gain. Hence, the extent of the gain adjustment of the weighting circuits can be greatly improved. As a result, when the minimum amplitude value of the above-mentioned compensable "signal waveform after transmission" is used as an indicator for representing the compensation extent of the distorted waveform, the value of the present embodiment can be improved 20% or more while retaining a necessary band characteristic, compared with the conventional circuit.

Figure 8:
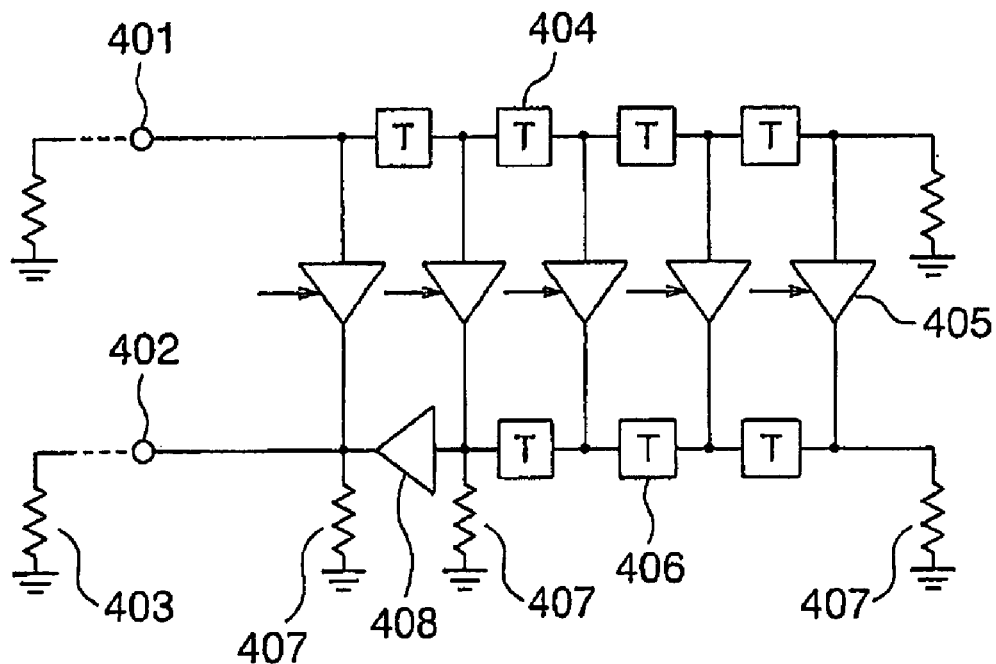
FIG. 8 is a circuit diagram illustrating a configuration of a third embodiment of the present invention.

FIG. 8 is a circuit diagram illustrating an equalizing filter circuit according to the third embodiment of the present invention in a transversal filter. In FIG. 8, reference numeral 401 designates a filter input terminal; 402, a filter output terminal; 403, an output load that is formed in the output circuit of the present filter; 404, delay devices connected in cascade to the input side; 405, gain adjustable weighting circuits having input ends thereof connected to the input terminal 401 and output ends of the respective delay devices 404; 406, delay devices connected in cascade to the output side; 407, loads connected to the output end of the delay device 405 which is arranged closer to the output terminal and to the opposite ends of the cascade connected delay devices, and having an impedance, respectively, which is different from that of the output load 403; and 408, an impedance converting circuit connected between the output end of the delay device on the output side and the output node of the weighting circuit 405 that is arranged closer to the output terminal. Now, on the input side of the impedance converting circuit 408, the impedance values of the two loads 407 are essentially identical to each other, but the loads 407 on the input and output sides of the impedance converting circuit may not have identical impedance values.

In the present embodiment, the loads 407 having impedance values different from that of the output load 403 connected to the output terminal are connected to the weighting circuits 405, and the range of gain adjustment of the weighting circuits can be optionally set without any influence by the impedance value of the output load 403. Further, when matching is taken among the delay devices 406 connected in cascade to the output terminal, the loads 407 and the output portions of the weighting circuits, an equalizing filter characteristic of broadband and high gain can be realized. Hence, the extent of the gain adjustment of the weighting circuits can be greatly improved. Consequently, when the minimum amplitude value of the above-mentioned compensable "signal waveform after transmission" is used as an indicator for representing the compensation extent of the distorted waveform, the value of the present embodiment can be improved 15% or more while maintaining a necessary band characteristic, compared with the conventional circuit.

Figure 9:
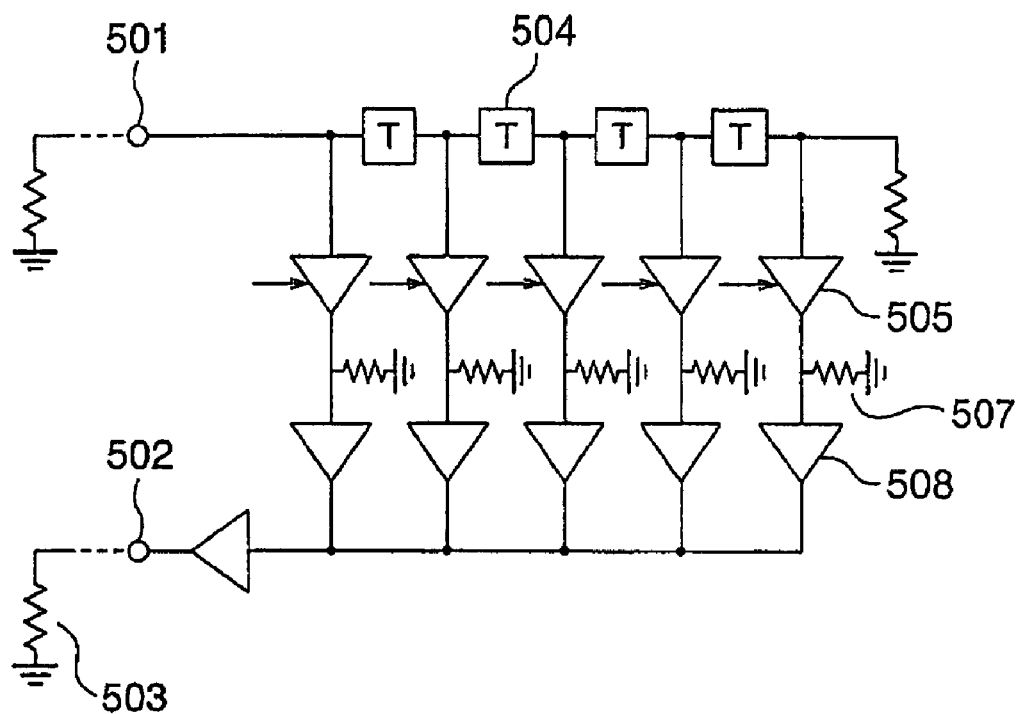
FIG. 9 is a circuit diagram illustrating a configuration of a forth embodiment of the present invention.

FIG. 9 is a circuit diagram illustrating an equalizing filter circuit according to the fourth embodiment of the present invention in a transversal filter. In FIG. 9, reference numeral 501 designates a filter input terminal; 502, a filter output terminal; 503, an output load that is formed in the output circuit of the present filter; 504, delay devices connected in cascade to the input side; 505, gain adjustable weighting circuits having input ends thereof connected to the input terminal 501 and the output ends of the respective delay devices 504; 507, loads connected to the output ends of the respective weighting circuits 505, and having an impedance, respectively, which is different from that of the output load 503; and 508, an impedance converting circuit connected between the output ends of the respective weighting circuits 505 and the filter output terminal 502.

In the present embodiment, the loads 507 having an impedance value, respectively, which is different from that of the output load 503 connected to the output terminal 502 are connected, respectively, to the respective weighting circuits, and the extent of gain adjustment of these weighting circuits are optionally set without receiving any influence by the load 503 connected to the output terminal. Thus, the degree of freedom of the gain adjustment extent is increased, and it becomes possible to achieve an optimum design of the gain while retaining a necessary band characteristic. As a result, when the minimum amplitude value of the above-mentioned compensable "signal waveform after transmission" is used as an indicator for representing the compensation extent of the distorted waveform, the value of the present embodiment can be enhanced 10% or more in comparison with the conventional circuit, while retaining a substantially equal band characteristic.

Figure 10:
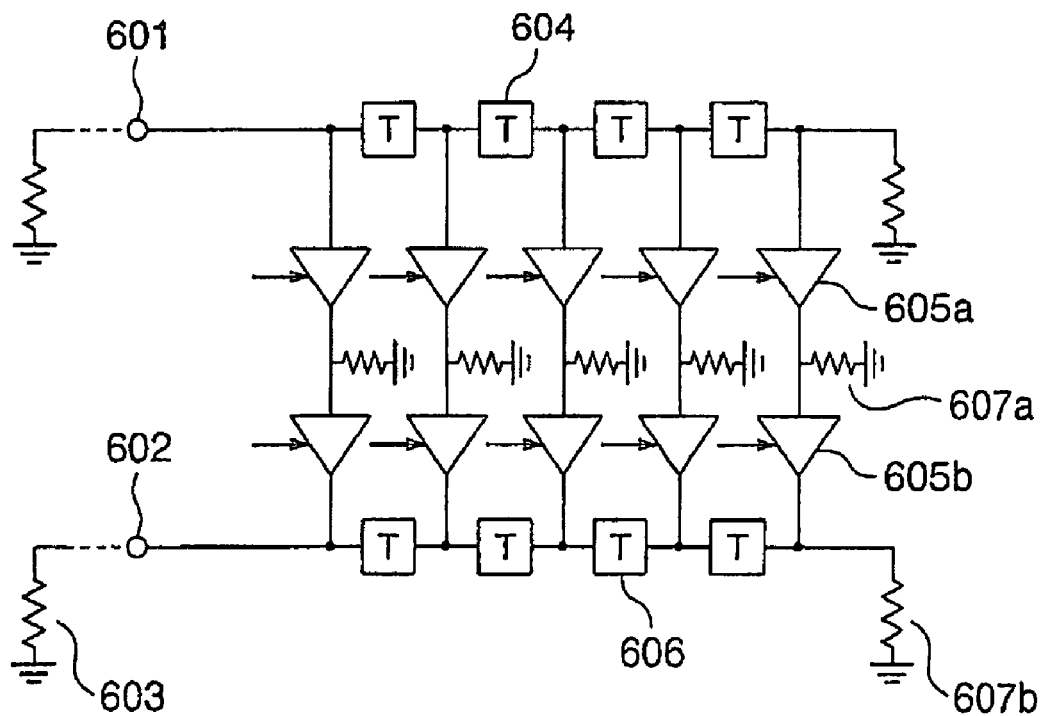
FIG. 10 is a circuit diagram illustrating a configuration of a fifth embodiment of the present invention.

FIG. 10 is a circuit diagram illustrating an equalizing filter circuit according to the fifth embodiment of the present invention in a transversal filter. In FIG. 10, reference numeral 601 designates a filter input terminal; 602, a filter output terminal; 603, an output load that is formed in the output circuit of the present filter; 604, delay devices or units connected in cascade to the input side; 605a, first gain adjustable weighting circuits having input ends thereof connected to the input terminal 601 and the output ends of the respective delay devices 604; 605b, second gain adjustable weighting circuits having input ends thereof connected to the output ends of the respective first weighting circuits 605a; 606, delay devices or units connected in cascade to the output side; 607a, loads connected to the respective first weighting circuits 605a and being different from the output load 603, respectively, in their impedances; and 607b, a load which terminates the cascade connected delay devices 606. Incidentally, in the circuit of the present embodiment, the respective second weighting circuits exhibit a function of an impedance converting circuit.

In the present embodiment, the load resistances 607a having an impedance, respectively, which is different from that of the output load 603 connected to the output terminal are connected to the respective first weighting circuits 605a, and the extent of gain adjustment of the weighting circuits can be optionally set without receiving any influence by the impedance value of the output load 603. In addition to this fact, due to the multi-stage configuration of the weighting circuits, it becomes possible to achieve an increase in the degree of freedom of gain adjustment extent, and the optimum design of the gain can be achieved while retaining a necessary band characteristic. Consequently, as compared with the conventional circuit, although the band is identical, an enhancement of the compensation extent of 30% or more can be acquired under the evaluation base similar to the afore-mentioned one.

Figure 11:
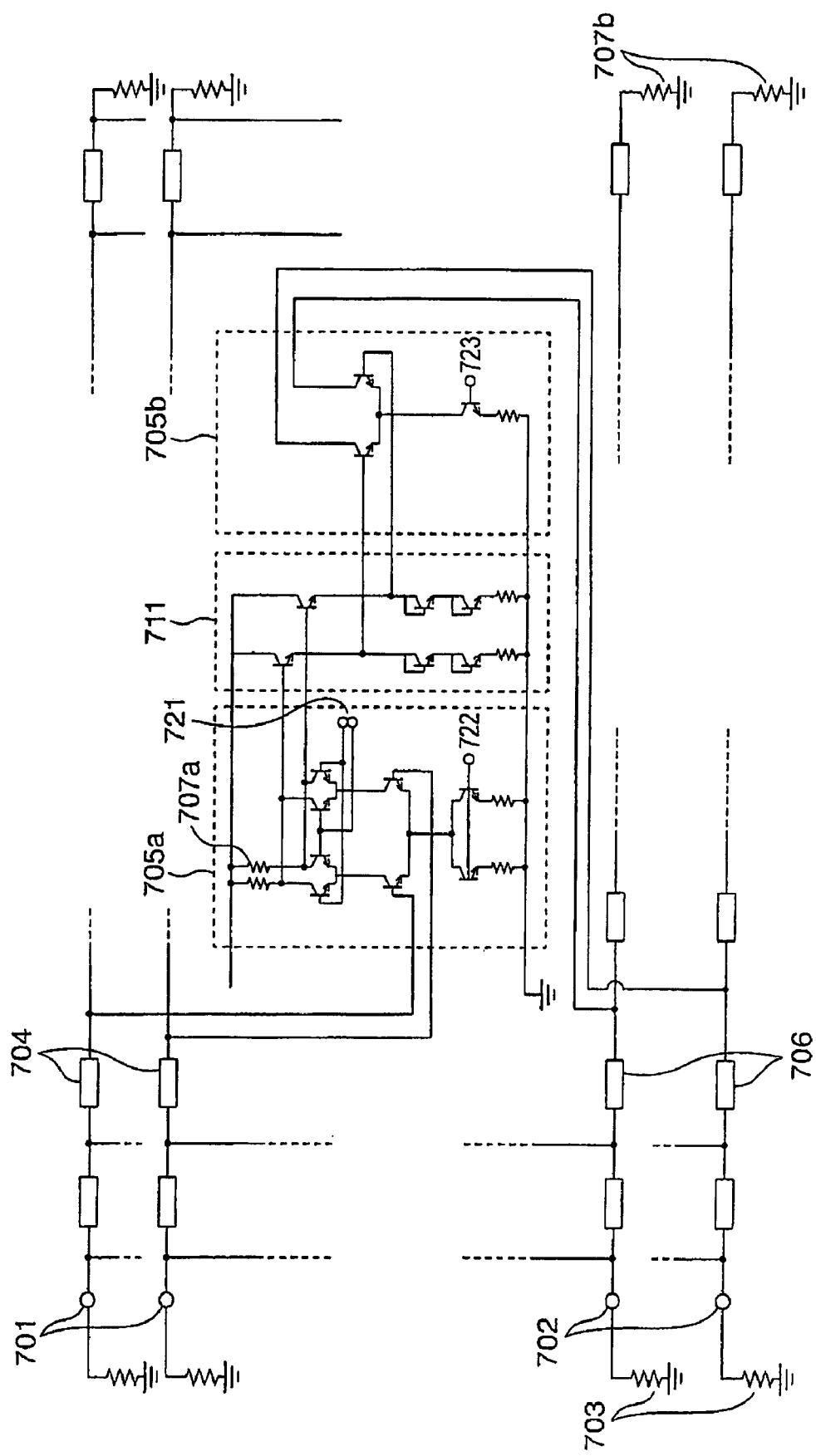
FIG. 11 is a circuit diagram illustrating a configuration of a sixth embodiment of the present invention.

FIG. 11 is a circuit diagram illustrating an equalizing filter circuit according to the sixth embodiment of the present invention in a transversal filter. In FIG. 11, weighting circuits connected to cascade connected delay devices or units are configured by the repetition of a similar circuit constitution and therefore, only one of them is illustrated with the remaining ones omitted for the simplicity sake. In FIG. 11, reference numeral 701 designates a filter input terminal; 702, a filter output terminal; 703, an output load that is formed in the output circuit of the present filter; 704, delay devices or units comprised of an inductor, a capacity and a resistance and connected in cascade to the input side; 705a, a first weighting circuit having its input terminals connected to the input terminal 701 and the output ends of the respective delay devices 704, and having series connected exclusive-or type configuration; 705b, a second weighting circuit of differential amplifier type, which receives output signal of the first weighting circuit 705a via a level converting circuit 711 and amplifies that signal; 706, delay devices comprised of an inductor, a capacity and a resistance and connected in cascade to the output side; 707a, loads connected to the output ends of the first weighting circuit 705a and different in their respective impedance from the output load 703; 707b, loads which terminate the cascade connected delay devices 706; and 721, 722, and 723, first, second and third gain adjusting terminals, respectively. Incidentally, in this embodiment, the load 707a is set at 100 ohms. Also, in the circuit of the present embodiment, the respective second weighting circuits 705b operate to exhibit a function of impedance converting circuit.

In the present embodiment, loads 707a having an impedance value, respectively, which is different from that of the output load 703 are connected to the output ends of the first weighting circuits. This shows that the gain adjustment range of each of the first weighting circuit can be optionally set without receiving any influence of the output load 703. Simultaneously, due to the weighting circuits of multi-stage constitution in addition to the output load resistance, degree of freedom of the extent of gain adjustment is extensively increased, and it became possible to achieve the optimum design of gain while retaining a necessary band characteristic. As a result, when the minimum amplitude value of the above-mentioned compensable "signal waveform after transmission" is used as an indicator for representing the compensation extent of the distorted waveform, the value of the present embodiment can be enhanced 30% or more in comparison with the conventional circuit, while retaining a substantially equal band characteristic.

Figure 12:
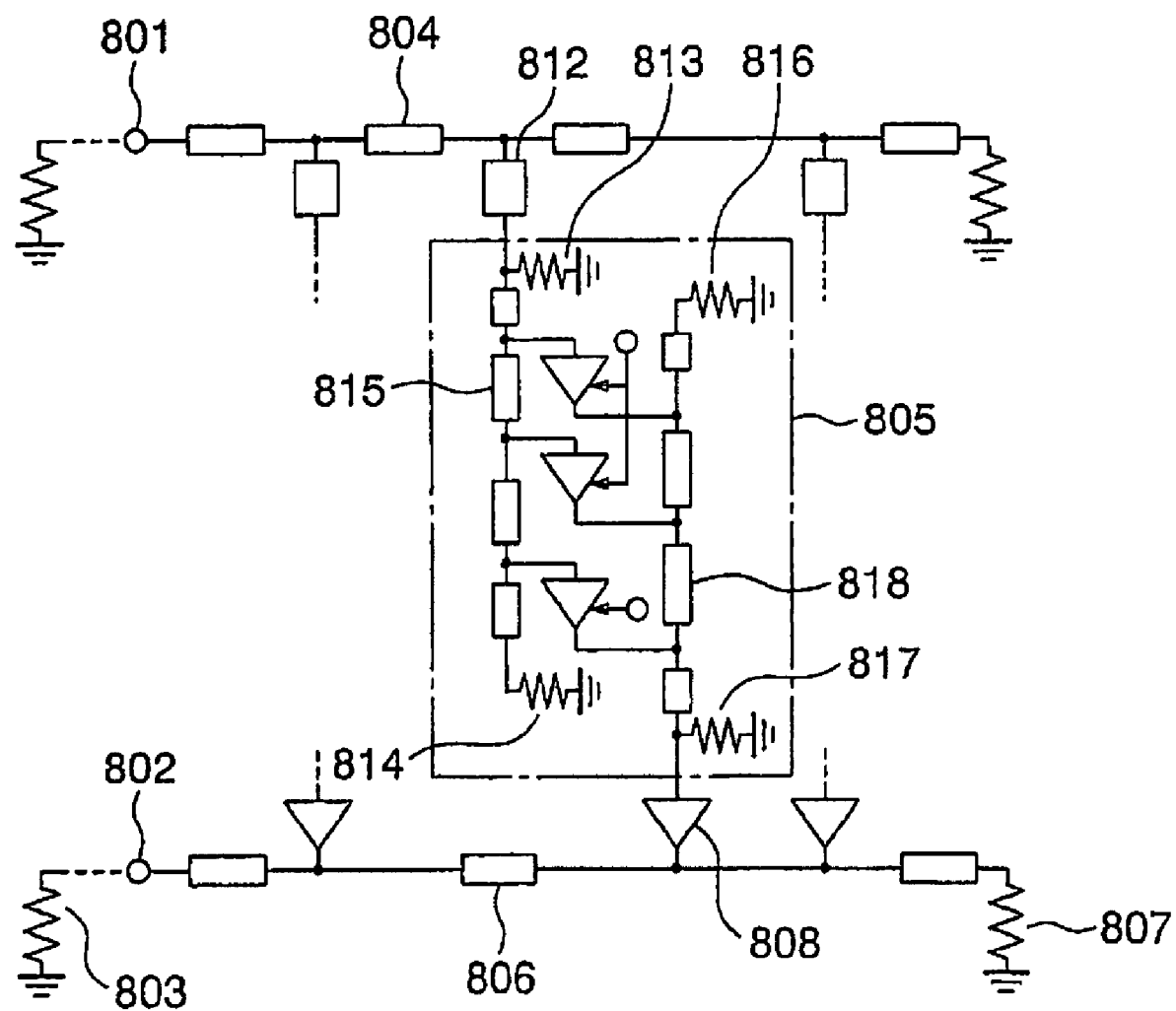
FIG. 12 a circuit diagram illustrating a configuration of a seventh embodiment of the present invention.

FIG. 12 is a circuit diagram illustrating an equalizing filter circuit according to the seventh embodiment of the present invention in a transversal filter. In addition, it is to be noted in FIG. 12 that weighting circuits connected to cascade connected delay devices are configured by the repetition of a similar circuit constitution and therefore, only one of them is illustrated with the remaining ones omitted for the simplicity sake. In FIG. 12, reference numeral 801 designates a filter input terminal; 802, a filter output terminal; 803, an output load that is given by the output circuit of the present filter; 804, delay devices comprised of transmitting lines connected in cascade to the input side; 805, weighting circuits having a distribution arrangement and configuration, respectively, each branching from a joining point of the neighboring delay devices 804; 806, delay devices comprised of transmitting lines connected in cascade to the output side; 807, loads which terminate the cascade connected delay devices 806; and 808, impedance converting circuits connected between an output end of each of the weighting circuits 805 and a joining point of the neighboring delay devices 806; and 812, matching circuits which provide impedance matching in broadband between the delay devices 805 and the weighting circuits 805. Now, the distribution type weighting circuits 805 is comprised of transmitting lines 815 and 818 constituting the delay devices, respectively, and having a characteristic impedance of 50 ohms, respectively, load resistances 813, 814, 816 and 817 which are matched with the transmitting lines 815 and 818, and gain adjustable amplifiers connected in multi-stage between the transmitting lines on the input and output sides. Incidentally, in the present embodiment, the characteristic impedances of the transmitting lines 815 and 818 may be set at any optional value.

In the present embodiment, the characteristic impedance of the transmitting line 818 may be set at an optional value and therefore, the resistance value of the load resistance 817 may be selected at an optional value. As a result, the gain adjustment extent of the weighting circuit 805 having a distribution type configuration can be optionally set without being affected by the output load 803 connected to the output terminal. Simultaneously, due to not only the load resistance but also the weighting circuit 805 having distribution type configuration, the gain and the band characteristic of the respective weighting circuits can be greatly improved. Accordingly, it is possible to establish the equalizing filter circuit which has a wide extent of gain adjustment, a wide band characteristic, or a still wider band. Consequently, when the minimum amplitude value of the above-mentioned compensable "signal waveform after transmission" is used as an indicator for representing the compensation extent of the distorted waveform, the value of the present embodiment can be enhanced 30% or more in comparison with the conventional circuit, while retaining a substantially equal band characteristic.

Figure 13:
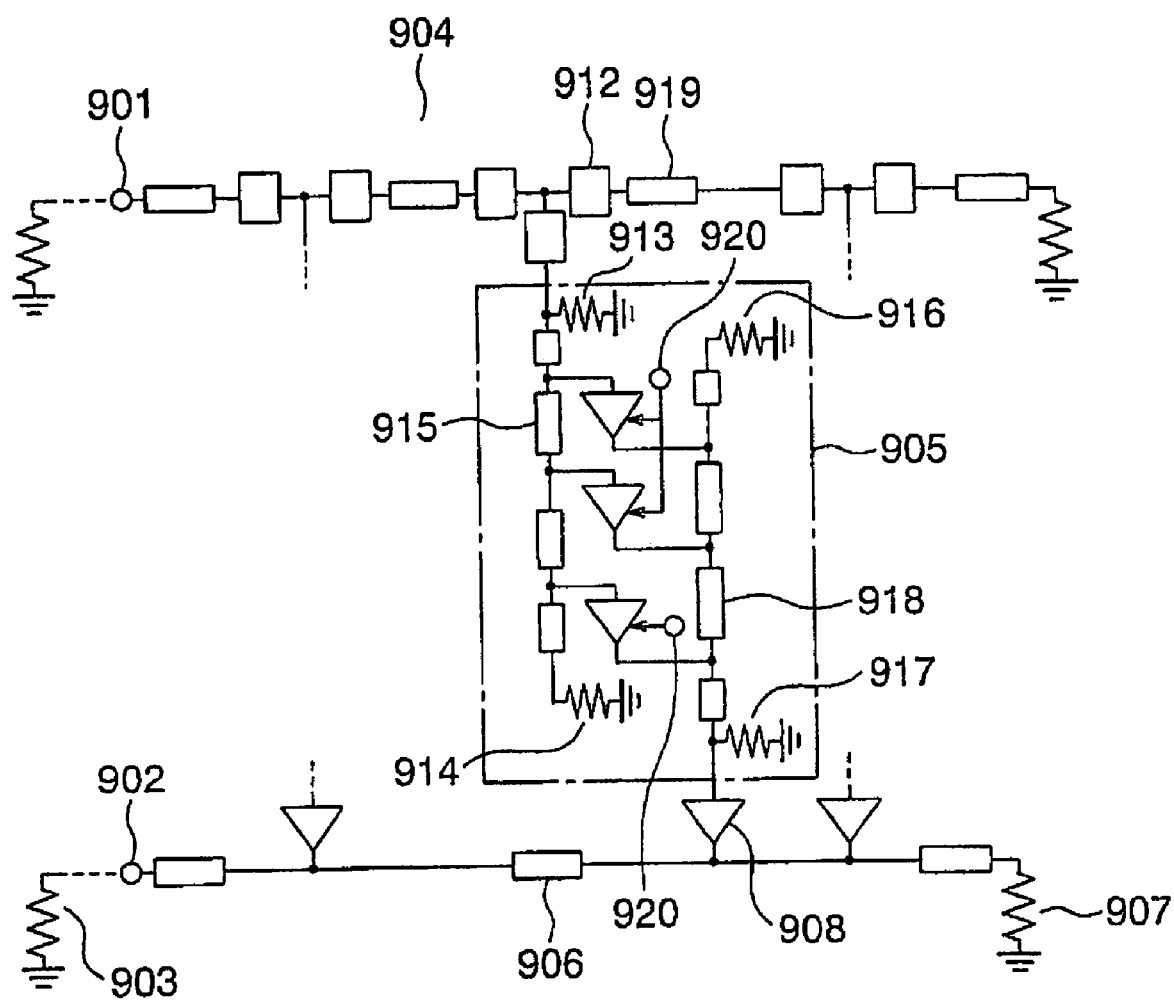
FIG. 13 is a circuit diagram illustrating a configuration of an eighth embodiment of the present invention.

FIG. 13 is a circuit diagram illustrating an equalizing filter circuit according to the eighth embodiment of the present invention in a transversal filter. It is to be noted in FIG. 13 that weighting circuits connected to cascade connected delay devices are configured by the repetition of a similar circuit constitution and therefore, only one of them is illustrated with the remaining ones omitted for the simplicity sake. In FIG. 13, reference numeral 901 designates a filter input terminal; 902, a filter output terminal; 903, an output load that is generated in the output circuit of the present filter; 904, delay devices comprised of matching circuits 912 connected in cascade to the input side and transmitting lines 919; 905, weighting circuits having a distribution arrangement and configuration, respectively, each branching from a joining point of the neighboring delay devices 904; 906, delay devices or units comprised of transmitting lines connected in cascade to the output side; 907, a load which terminates the cascade connected delay devices 906; and 908, impedance converting circuits connected between an output end of each of the weighting circuits 905 and a point of connection between the neighboring delay devices 906. The illustrated distribution type weighting circuit 905 is comprised of transmitting lines 915 and 918 constituting delay devices, respectively, and having characteristic impedances of 50 ohms and 75 ohms, respectively, load resistances 913 and 914 of 50 ohms, respectively, which are matched with the transmitting line 915, load resistances 916 and 917 of 75 ohms, respectively, which are matched with the transmitting line 918, and gain adjustable amplifiers having gain adjusting terminals 920, which are connected in multi-stage between transmitting lines on the input and output sides.

In the present embodiment, an impedance converting circuit 908 is connected between the output load 903 and the weighting circuit 905, and the impedances of the transmitting lines 918 of the weighting circuit 905 and those of the load resistances 916 and 917 can be set at an optional value irrespective of the output load 903. Therefore, the gain adjusting extent of the distribution type weighting circuit 905 can be optionally set without receiving any influence by the output load 903. Hence, in the present embodiment, this resistance value is not set to be ordinary 50 ohms but is set to be 75 ohms, and impedance of a transmitting line 910 connected to the output end of the weighting circuit 905 is set at 75 ohms. The weighting circuit 905 constituted as distribution type amplifier having the described output impedance, can realize a high gain characteristic and a broadband characteristic, respectively. Further, due to not only the load resistances 916 and 917 but also the weighting circuit 905 having a distribution type configuration, the gain and the band characteristic of the weighting circuit can be remarkably enhanced. Therefore, the degree of freedom of adjusting extent of the weighting circuit is greatly increased, and an equalizing filter circuit can be realized while attaining either securement of a necessary band characteristic or further enhancement of band. Furthermore, by virtue of the weighting circuits 905 capable of being individually controllable in respective gain adjustments, fine adjustment of filter coefficient as well as controlling of group delay, which were unable to be achieved by the conventional circuit, can be achieved thereby enhancing an accuracy in compensation for the distorted waveform. As a result, when the minimum amplitude value of the above-mentioned compensable "signal waveform after transmission" is used as an indicator for representing the compensation extent of the distorted waveform, the indicator value of the present embodiment can be improved 40% or more in comparison with the conventional circuit, while an enhancement of the band characteristic by 10% or more could be achieved.

Figure 14:
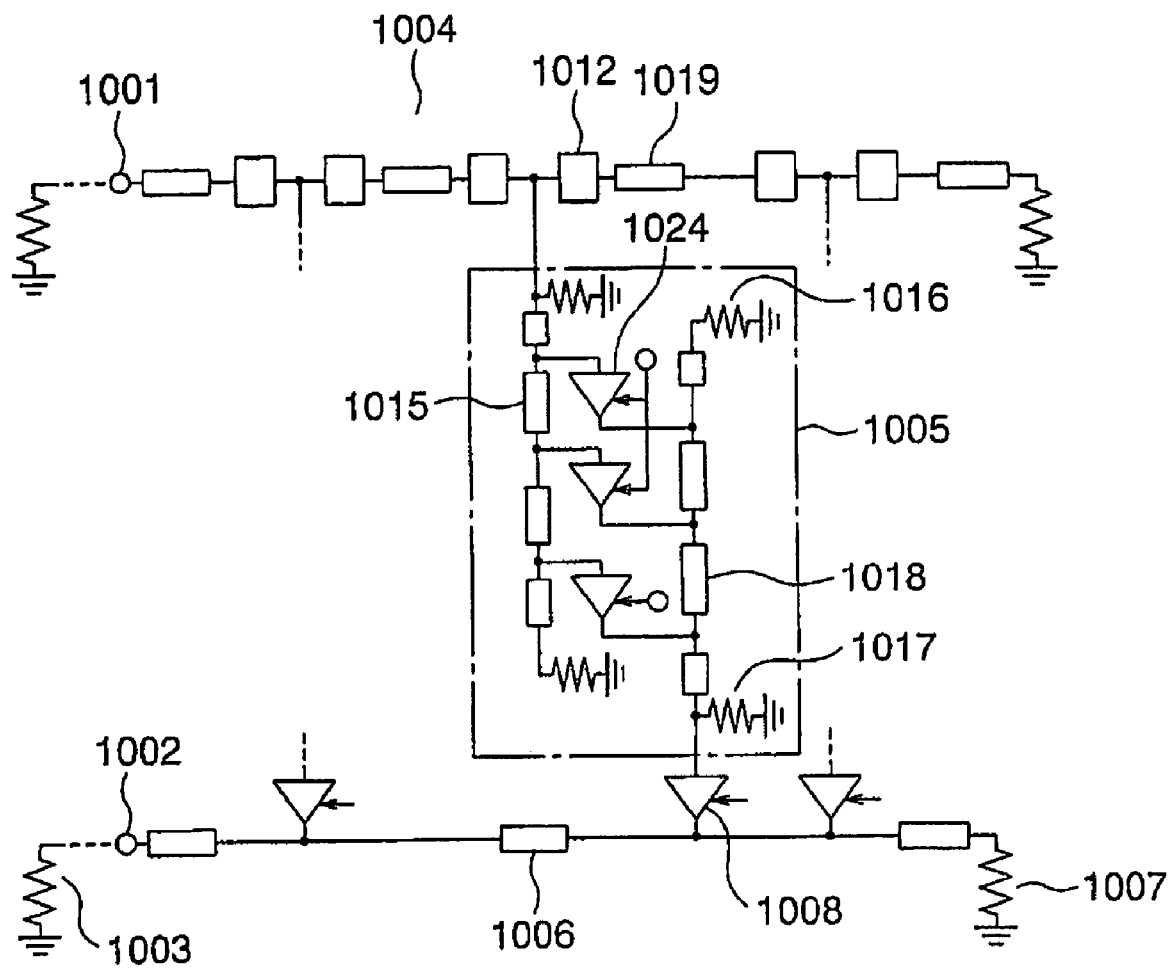
FIG. 14 is a circuit diagram illustrating a configuration of a ninth embodiment of the present invention.

FIG. 14 is a circuit diagram illustrating an equalizing filter circuit according to the ninth embodiment of the present invention in a transversal filter. It is to be noted in FIG. 14 that weighting circuits connected to cascade connected delay devices are configured by the repetition of a similar circuit constitution and therefore, only one of them is illustrated with the remaining ones omitted for the simplicity sake. Incidentally, a circuit configuration of a unit amplifier of the distribution type weighting circuit connected to cascade connected delay devices as illustrated in FIG. 14 is shown in FIG. 15, a circuit configuration of an impedance matching circuit on the input side in FIG. 16, and a circuit configuration of an impedance matching circuit on the output side in FIG. 17, respectively.

In FIG. 14, reference numeral 1001 designates an filter input terminal; 1002, an filter output terminal; 1003, an output load formed in the output circuit of the present filter; 1004, delay devices connected in cascade to the input side and comprised of matching circuits 1012 and transmitting lines 1019; 1005, weighting circuits having a distribution arrangement and configuration, respectively, each branching from a joining point of the neighboring delay devices 1004, 1006 delay devices comprised of transmitting lines connected in cascade to the output side; 1007, a load which terminates the cascade connected delay devices 1006; and 1008, impedance converting circuits with gain adjusting function, which are connected between an output end of each of the weighting circuits 1005 and a joining point of the neighboring delay devices 1006. Now, the distribution type weighting circuit 1005 is comprised of transmitting lines 1015 and 1018 constituting delay devices, respectively, and having characteristic impedances of 50 ohms and 100 ohms, respectively, load resistances 1013 and 1014 of 50 ohms, respectively, which are matched with the transmitting line 1015, load resistances 1016 and 1017 of 100 ohms, respectively, which are matched with the transmitting line 1018, and gain adjustable unit amplifiers 1024, which are connected in three-stage between transmitting lines on the input and output sides.

Figure 15:
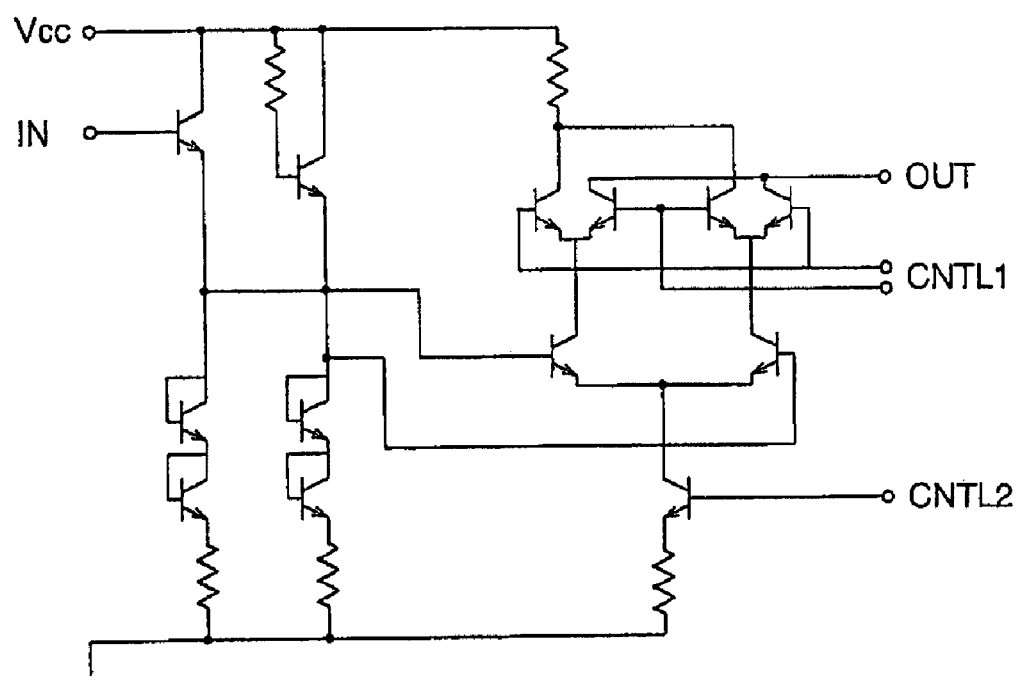
FIG. 15 is a circuit diagram of a unity amplifier device which is a constituent of a weighting circuit used in the ninth embodiment of the present invention.

The unit amplifiers 1024 which serve as constituents of the weighting circuit are respectively provided with an input terminal IN connected to the transmitting line 1015 and an output terminal OUT connected to the transmitting line 1018, as shown in FIG. 15, and have a series connected exclusive-or type configuration. The unit amplifier 1024 is able to set the positive and the negative of its gain as well as the value of the gain by adjusting the bias of a first gain adjusting terminal CNT1 thereof, and further is able to set the value of the gain by also the bias adjustment of a second gain adjusting terminal CNT2.

Figure 16:
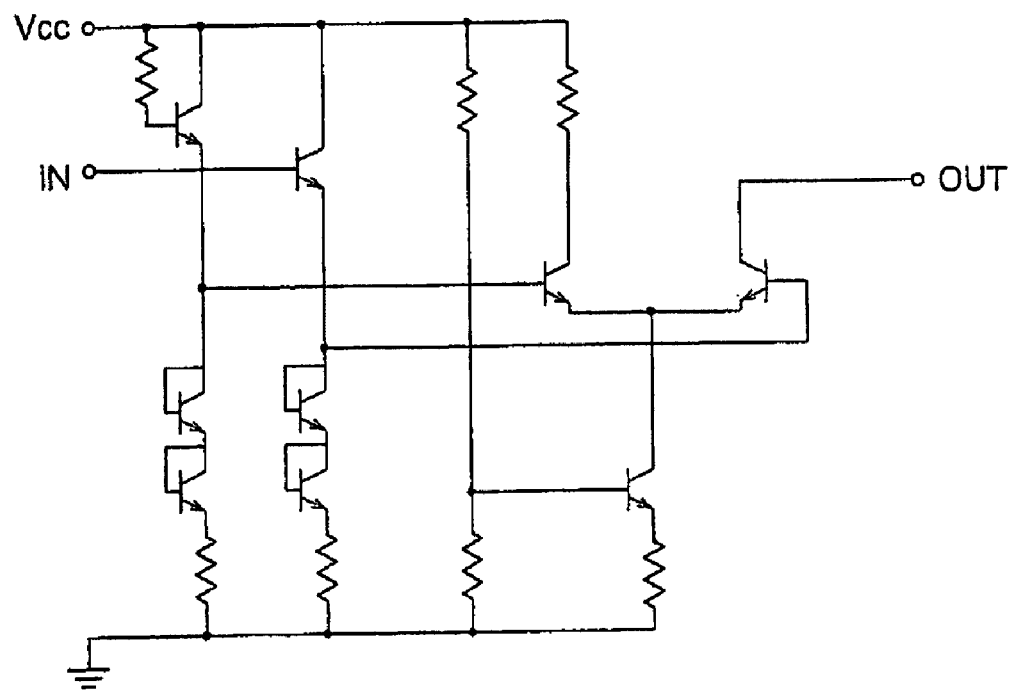
FIG. 16 is a circuit diagram illustrating a configuration of a matching circuit on an input side, used in the ninth embodiment of the present invention.
Figure 17:
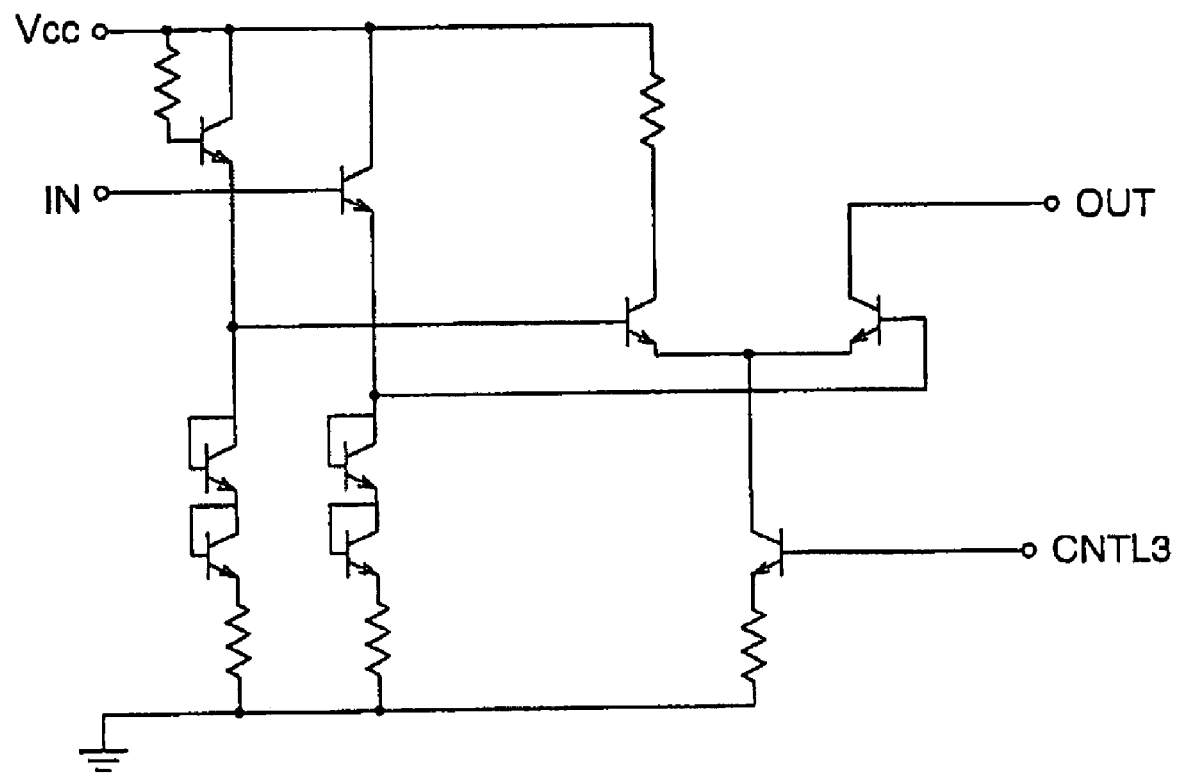
FIG. 17 is a circuit diagram illustrating a configuration of an impedance converting circuit on an output side, used in the ninth embodiment of the present invention.

In FIG. 14, for the simplicity sake, it is illustrated in such a manner that each unit amplifier 1024 has only one gain adjusting terminal, but actually, each unit amplifier is provided with two gain adjusting terminals as shown in FIG. 15. Furthermore, the matching circuits 1012 which carry out impedance matching on the input side are respectively configured, as shown in FIG. 16, by an emitter follower into which a signal inputs from an input terminal IN and a differential amplifier in which a signal outputs from an output terminal OUT of an open collector. The impedance converting circuits 1008 on the output side are respectively configured as shown in FIG. 17, by an emitter follower into which a signal inputs from an input terminal IN and a differential amplifier having a third gain adjusting terminal CNT3 and an open collector type output terminal OUT.

In the present embodiment, impedance converting circuits 1008 are connected between the output load 1003 and the weighting circuit 1005, and the impedances of the transmitting line 1018 of the weighting circuit 1005 and the load resistances 1016 and 1017 can be set at an optional value irrespective of the output load 1003. Accordingly, the gain adjustment extent of the weighting circuit 1005 having a distribution type configuration is able to be optionally set without receiving any influence by the output load 1003. Simultaneously, due to not only an increase in the output load resistance but also the weighting circuit 1005 having the distribution type configuration and the impedance converting circuits 1008 having an amplifying function, respectively, the gain and the band characteristic of the weighting circuit are greatly improved. Thus, the impedance converting circuits 1008 having the amplifying function can carry out fine adjustment of the output of the weighting circuit 1005 by using a third gain adjusting terminal as shown in FIG. 17, and simultaneously can exhibit such an advantageous effect that isolation between the delay devices 1006 on the output side and the weighting circuit 1005 may be enhanced. Thus, the present embodiment brings about widening the degree of freedom of the adjustment extent of the weighting circuit, and realizes an equalizing filter circuit while attaining either securement of a necessary band characteristic or further enhancement of band. Furthermore, in the present embodiment, by virtue of the weighting circuits 1005 capable of being individually controllable in respective gain adjustments and the impedance converting circuit 1008, fine adjustment of filter coefficient as well as controlling of group delay, which were unable to be achieved by the conventional circuit, can be achieved thereby enhancing an accuracy in compensation for the distorted waveform. Consequently, when the minimum amplitude value of the above-mentioned compensable "signal waveform after transmission" is used as an indicator for representing the compensation extent of the distorted waveform, the indicator value of the present embodiment can be improved 30% or more in comparison with the conventional circuit, while an enhancement of the band characteristic by 10% or more could be achieved.

Figure 18:
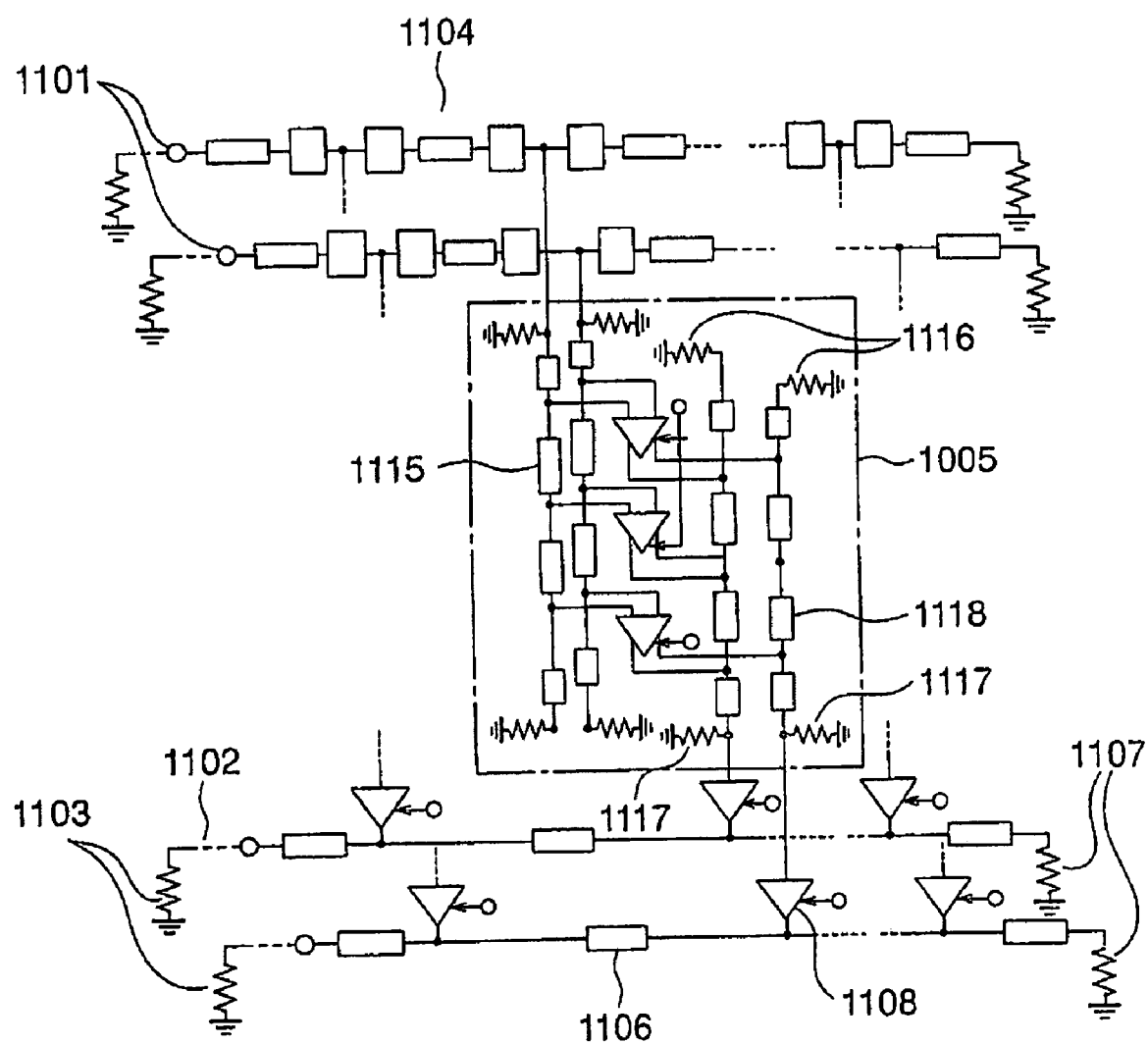
FIG. 18 a circuit diagram illustrating a configuration of a tenth embodiment of the present invention.
Figure 19:
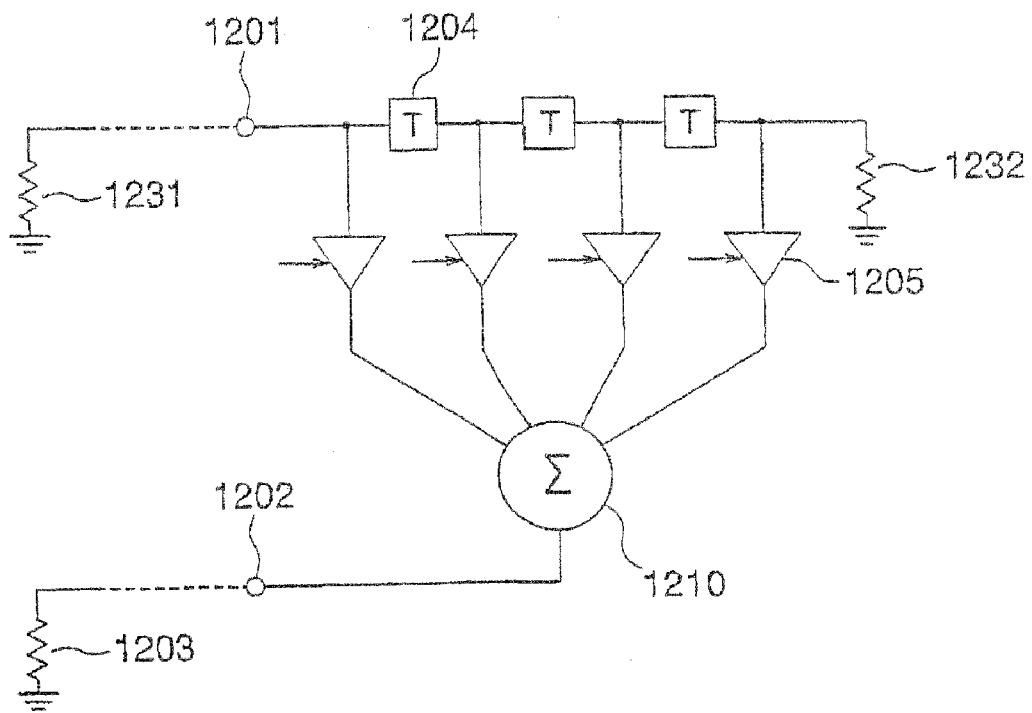
FIG. 19 is a block diagram illustrating a configuration of an equalizing filter circuit according to the prior art.
Figure 20:
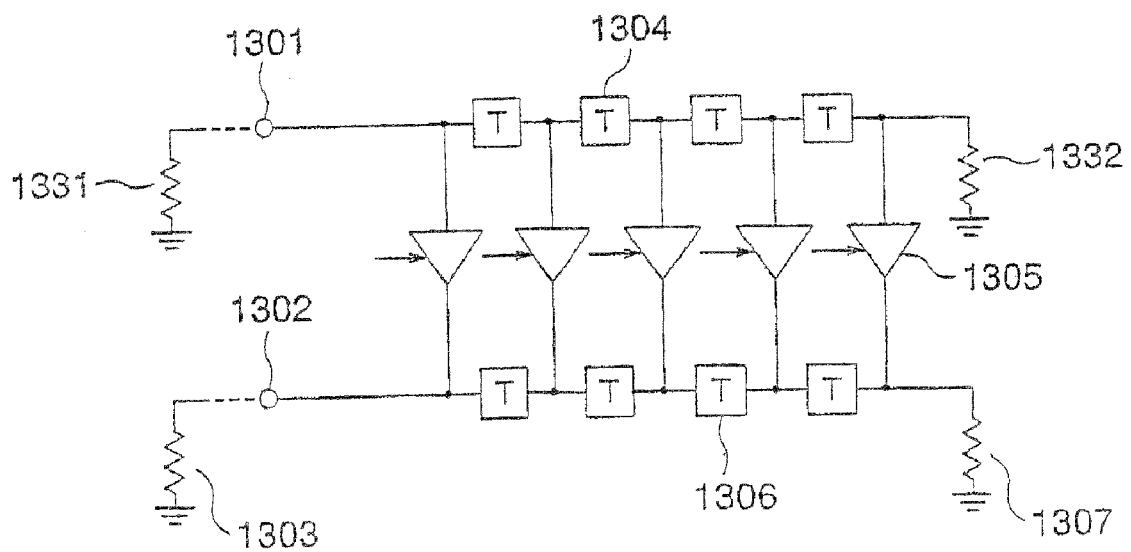
FIG. 20 is a circuit diagram illustrating a specific example of configuration of the equalizing filter circuit according to the prior art.

FIG. 18 is a circuit diagram illustrating an equalizing filter circuit according to the tenth embodiment of the present invention in a transversal filter. In FIG. 18, weighting circuits connected to cascade connected delay devices are configured by the repetition of a similar circuit constitution and therefore, only one of them is illustrated with the remaining ones omitted for the simplicity sake.

In the above-described first through fifth and seventh through 9 embodiments, a case of circuit configuration where an input and an output are a single phase signal, respectively, is indicated. However, in the case where an input and an output are differential signals, respectively, due to provision of two systems of input and output terminals, it is easily achieved to provide a circuit configuration corresponding to the differential signals. The tenth embodiment shown in FIG. 18 has such an arrangement that the ninth embodiment is modified so as to correspond to the differential signals with respect to both the input and output. In FIG. 18, those identical with the portions of FIG. 14 illustrating the ninth embodiment are indicated by reference numerals of which the lower two figures are common with each other, and a detailed description of such portions is omitted. By an employment of such a circuit configuration as shown in this drawing figure, an equalizing filter circuit having an amount of compensation for a distorted waveform, which is similar to or more than the compensation amount of the ninth embodiment can be realized.

INDUSTRIAL APPLICABILITY

In the foregoing embodiments, although an explanation has thus far been made about emitter followers, exclusive OR circuits, differential amplifiers, and amplifiers, all of which are structured by the use of bipolar transistors, any other semiconductor devices, such as a field effect transistor (FET) and a MOS transistor, may be used for constituting a source follower, an exclusive OR circuits, a differential amplifiers, an amplifier and a complementary circuit may be adopted. Also, an embodiment provided by an appropriate combination of the afore-mentioned respective embodiments may be put into practice. Further, the equalizing filter circuit according to the present invention may be applicable to all of the optical communication, the cable communication, and the wireless communication. Furthermore, although the description of the present invention has been provided according to the above-described various embodiments, it is to be noted that the present invention is not limited to the described embodiments and includes various modifications and improvements that could occur to a person having an ordinary skill within the scope of the invention as claimed in the accompanying claims.

The invention claimed is:

1. An equalizing filter circuit, comprising:
an input terminal;
an output terminal having an output impedance value of an output circuit connected to the output terminal;
delay devices connected in multi-stage to the input terminal;
a plurality of first weighting circuits branching from and connected to the delay devices, each first weighting circuit having an output; and
at least one weighting circuit load having an impedance connected at the output of one of the first weighting circuits,
wherein an impedance value of the weighting circuit load is different from the output impedance value at the output terminal.

2. The equalizing filter circuit according to claim 1, further comprising an impedance converting circuit connected to the output of said one first weighting circuit.

3. The equalizing filter circuit according to claim 1, wherein one of said at least one weighting circuit load is connected to the output of each of the first weighting circuits, and an impedance converting circuit is connected at the output of said one first weighting circuit.

4. The equalizing filter circuit according to claim 1, wherein one of said at least one weighting circuit load and one of said impedance converting circuit are connected to the output of each of the first weighting circuits, and outputs of the impedance converting circuits are connected in common to the output terminal.

5. The equalizing filter circuit according to claim 1, further comprising:
a plurality of second weighting circuits, each second weighting circuit connected to the output of a different one of the first weighting circuits; and
plural output delay devices, each output delay device connected between the outputs of said second weighting circuits,
wherein one of said at least one weighting circuit load is connected to each of the outputs of said first weighting circuits.

6. The equalizing filter circuit according to claim 1, further comprising:
output delay devices connected in series to each other, each output delay device connected to the output of one of the first weighting circuits.

7. The equalizing filter circuit according to claim 6, wherein plural of said at least one weighting circuit load are connected to the output delay devices.

8. The equalizing filter circuit according to claim 7, wherein each of the output delay devices is constituted by a transmission line.

9. The equalizing filter circuit according to claim 1, wherein each of the first weighting circuits comprise a plurality of amplifiers.

10. The equalizing filter circuit according to claim 9, wherein the plurality of amplifiers comprising each of the first weighting circuits comprise an independently controllable amplifier.

11. The equalizing filter circuit according to claim 9, wherein each first weighting circuit comprises an input side transmitting line and an output side transmitting line, and wherein the plurality of amplifiers are branched from the input side transmitting line and have output portions connected to the output side transmitting line.

12. The equalizing filter circuit according to claim 11, wherein resistance elements are operable as loads of the amplifiers and are connected to both ends of the output side transmitting line.

13. The equalizing filter circuit according to claim 11, wherein characteristic impedance of the output side transmitting line is higher than an impedance of a load formed in the output circuit connected to the output terminal.

14. The equalizing filter circuit according to claim 13, further comprises a matching circuit disposed either within the delay device or at a connecting portion of the delay device and the weighting circuit.

15. The equalizing filter circuit according to claim 14, wherein the matching circuit is provided with an impedance converting function.

16. The equalizing filter circuit according to claim 15, wherein the delay devices are constituted by transmitting lines.

17. The equalizing filter circuit according to claim 16, wherein the input terminal, the output terminal, and the delay devices are formed in pair, respectively, and the weighting circuits are configured to carry out a differential operation, respectively.

18. An equalizing filter circuit comprising:
an input terminal;
an output terminal;
delay devices connected in multi-stage to the input terminal; and
a plurality of first gain adjustable weighting circuits branching from and connected to the delay devices, to thereby combine respective output signals of the weighting circuits together,
wherein an impedance converting circuit is connected at a position between at least one of the weighting circuits and the output terminal.

19. The equalizing filter circuit according to claim 18, wherein each of the plurality of first gain adjustable weighting circuits are individually adjusted.

20. An equalizing filter circuit comprising:
a filter input terminal;
a filter output terminal, wherein an output circuit having a first impedance value is connected to the output terminal;
a plurality of delay devices connected in multi-stage to the input terminal;
a plurality of weighting circuits branching from and connected to the plurality of delay devices;
an adder connected to outputs of the weighting circuits; and
a weighting circuit load having a first terminal connected between the output of one of the weighting circuits and an input of the adder, the weighting circuit load having an impedance value different from the first impedance value of the output circuit.

21. The equalizing filter circuit according to claim 20, wherein the weighting circuit load has a second terminal connected to ground.

22. The equalizing filter circuit according to claim 20, the equalizing filter further comprising a plurality of weighting circuit loads, wherein one weighting circuit load is connected between each of the plurality of weighting circuits and the adder.

23. The equalizing filter circuit according to claim 22, wherein the impedance value of at least two of the plurality of weighting circuit loads is different.

24. The equalizing filter circuit according to claim 22, wherein the impedance value of the plurality of weighting circuit loads is individually set based on attenuation in each of the plurality of weighting circuits.

* * * * *